United States Patent
Weimer

(10) Patent No.: US 8,308,882 B2
(45) Date of Patent: Nov. 13, 2012

(54) HOLLOW FIBER COMPOSITE COMPONENT AND INTERMEDIATE PRODUCTS

(75) Inventor: Christian Weimer, Munich (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 208 days.

(21) Appl. No.: 12/622,651

(22) Filed: Nov. 20, 2009

(65) Prior Publication Data

US 2010/0092707 A1    Apr. 15, 2010

Related U.S. Application Data

(62) Division of application No. 11/054,178, filed on Feb. 9, 2005, now Pat. No. 7,641,834.

(30) Foreign Application Priority Data

Feb. 10, 2004  (DE) .......................... 10 2004 006 61

(51) Int. Cl.
*B32B 7/04* (2006.01)
*B64C 1/00* (2006.01)
*B28B 23/00* (2006.01)
*B29D 22/00* (2006.01)

(52) U.S. Cl. .......... 156/91; 428/34.1; 428/36.1; 428/58; 428/102; 428/104; 428/119; 244/123.1; 244/123.14

(58) Field of Classification Search .................. None
See application file for complete search history.

(56) References Cited

U.S. PATENT DOCUMENTS

| 5,108,810 | A | 4/1992 | Williams |
|---|---|---|---|
| 5,158,733 | A | 10/1992 | Trimble |
| 5,308,228 | A * | 5/1994 | Benoit et al. ............ 416/230 |
| 5,484,634 | A | 1/1996 | Schutze |
| 5,853,651 | A | 12/1998 | Lindsay et al. |
| 6,896,841 | B2 | 5/2005 | Velicki et al. |
| 2003/0057603 | A1 | 3/2003 | Buchs et al. |

FOREIGN PATENT DOCUMENTS

| DE | 2519692 | 11/1976 |
|---|---|---|
| EP | 0244120 | 11/1987 |
| EP | 1459873 | 9/2004 |
| GB | 1144715 A | 3/1969 |
| WO | 03103933 A1 | 12/2003 |

OTHER PUBLICATIONS

German Search Report, Application Serial No. DE 2004 006 615.9, German Patent & Trademark Office, Feb. 21, 2006 (English translation submitted herein).
Search Report for GB0502704.0 dated Mar. 21, 2005.

* cited by examiner

*Primary Examiner* — Camie Thompson
(74) *Attorney, Agent, or Firm* — Brooks Kushman P.C.

(57) ABSTRACT

A three-dimensional hollow fiber component includes a first sheet having first; second, third, fourth and fifth consecutive adjacent sheet sections, the first and fifth sections being end sections, the sheet shaped so as to surround a first chamber such that the first and fifth sections overlap to form a top wall of the first chamber and are stitched to each other by at least one seam and a second sheet having first, second, third, fourth and fifth adjacent consecutive sheet section, the first and fifth sections being end sections, the sheet sections shaped so as to surround a second chamber such that the first and fifth sections overlap to form a top wall of the second chamber and are stitched to each other by at least one seam.

7 Claims, 3 Drawing Sheets

HOLLOW FIBER COMPOSITE COMPONENT AND INTERMEDIATE PRODUCTS

This application is a divisional of U.S. patent application Ser. No. 11/054,718, filed on Feb. 9, 2005 (now U.S. Pat. No. 7,641,834), which claims the benefit of German Patent Application No. DE 10 2004 006 615.9, filed on Feb. 10, 2004, all of which are incorporated by reference herein.

The present invention relates to the manufacture of a hollow fiber-composite component (hereinafter called an HFC component for short), which has at least two or more hollow chambers located adjacent to each other, which are separated from each other by an integral, rib-like or web-like partition. Further, the present invention concerns an intermediate product for the manufacture of such an HFC component. And lastly the present invention concerns a special suitable HFC component which can be manufactured by the disclosed method or with the aid of this intermediate product.

BACKGROUND

HFC components in general have a reinforcing fiber structure which is saturated or impregnated with a resin which is hardened during the process of manufacture of the component. The reinforcing fiber structure is constructed, e.g., from one or more blanks of a two-dimensional, web-like reinforcing fiber material. The blanks are here arranged in one or more layers. The fiber architecture of the reinforcing fiber structure, i.e., in particular a predetermined fiber orientation and/or fiber distribution, as well as a predetermined layer structure of the blanks used and hence of the whole reinforcing fiber structure, is of particular importance for the desired properties of the HFC component, e.g. as low a weight as possible with strength as high as possible.

To obtain a high degree of prefabrication and hence rational production, it is desirable to provide the reinforcing fiber structure as far as possible as a prefabricated subunit in the form of a preform of reinforcing fiber material. For two-dimensional or shell-shaped or cup-shaped open fiber-composite components, this is relatively easy to achieve. The manufacture of HFC components and their preforms of reinforcing fiber material, on the other hand, is comparatively complicated and expensive, sometimes even highly problematic. Particularly in the case of complex HFC components, known technologies are up against their limits; and it is difficult or often impossible to manufacture complex HFC components of this kind with optimized fiber architecture.

It is known that ordinary HFC components can be manufactured by a tube-blowing RTM method. Here, tube-shaped preforms of reinforcing fiber material which are designed as hollow profiles and which can be made by circular knitting, circular weaving or braiding, are used. A molding tube is laid in the hollow preform which has a closed cross-sectional profile, and the preform is laid in an injection mould. Then the molding tube is inflated. Next resin is injected into the injection mould, i.e. between the inner circumferential surface of the mould and the outer circumferential surface of the molding tube, and the resin is hardened. It is obvious that with this technique only HFC components with a single hollow chamber can be made. Furthermore, the fiber architecture obtainable is greatly predetermined or restricted by the above-mentioned manner of manufacturing the preform, and so cannot be further optimized. In particular, reinforcing fiber structures or preforms which are constructed from several single layers of reinforcing fiber material with different or considerably diverging fiber orientation, cannot be made by this method. A prefabricated subunit with a fiber architecture which is optimized or adaptable to the most varied component geometries cannot therefore be achieved.

Tests were performed to produce, by this tube-blowing RTM method, HFC components which have at least two hollow chambers located adjacent to each other, which are separated from each other by an integral, rib-like or web-like partition (hereinafter called a rib for short). However, it turned out that, on account of the fiber architecture described above, which is fixed by manufacture of the tube-like preform, the rib can be only inadequately integrated in the tube-like reinforcing fiber structure or positioned in it. After a molding tube has been arranged in each of the two hollow chambers and inflated inside the injection mould and the resin has been injected, it further turned out that at this stage of the process too the predetermined position and precision of shape of the rib could not be ensured and the preform showed unstable behavior.

The problems described above are in practice avoided by a method which uses at least two adjacent, solid molding cores for fixing the position and shape of a rib/partition in a three-dimensional reinforcing fiber structure which forms a three-dimensional, hollow preform of reinforcing fiber material corresponding to the shape and dimensions of the HFC component to be manufactured. With this method two-dimensional, web-like reinforcing fiber material is cut to size and serves to form at least one planar, single- or multi-layer blank of a reinforcing fiber structure of the preform. The blanks are draped in an injection mould or stitching manufacture means to form the three-dimensional hollow preform of reinforcing fiber material. Within the framework of this process, the rib/partition from a portion of the blank is also draped. The at least two molding cores, the shape and dimensions of which are adapted to the respective hollow chamber of the fiber-composite component, are arranged in such a way that the regions of reinforcing fiber material provided for the rib/partition run exactly between the molding cores. As a result, the position and shape of the rib/partition are fixed in the three-dimensional reinforcing fiber structure and also in the injection mould.

This technique does of course allow the manufacture of complex HFC components with an optimized fiber architecture, but is very elaborate and requires the manufacture and use of molding cores which must later be removed again from the hardened HFC component. Furthermore, it turned out that during resin injection, in spite of the molding cores, there can be unwanted displacement or mutual displacement of the fiber layers of the preform or its reinforcing fiber structure, particularly in the region of the rib/partition. This in turn results in a disadvantageous change in the predetermined fiber architecture.

SUMMARY OF THE PRESENT INVENTION

It is an object or technical problem of the present invention to provide a novel method by which, in a simpler, more effective and/or more rational manner, complex HFC components which have at least two adjacent hollow chambers separated from each other by a rib-like partition can be manufactured with a precise fit and without a disadvantageous change in the predetermined fiber architecture of their three-dimensional reinforcing fiber structure. In this case it is desired that the method can be carried out in at least one variant without any molding cores. A further or alternative object is to provide an intermediate product particularly suitable for this method. An additional further or alternative object is to provide a special suitable HFC component which can be made by the method or with the aid of the intermediate product.

The present invention provides a method for the manufacture of an HFC component which has at least two closed hollow chambers located adjacent to each other which are separated from each other by an integral, rib-like or web-like partition, from a three-dimensional hollow preform of reinforcing fiber material corresponding to the shape and dimensions of the HFC component to be manufactured, includes the following steps, but not necessarily in the given order:

a) cutting two-dimensional, web-like reinforcing fiber material to size to form at least one planar, single- or multi-layer blank of a reinforcing fiber structure of the preform matching the final dimensions;
b) making at least one overlap in a region of the at least one blank which later defines the rib-like partition of the preform,
c) stitching this overlap in two dimensions by means of a compacting seam, as a result of which the shape and dimensions of the rib-like partition as well as its position in relation to adjacent regions of the blank are fixed, and the reinforcing fiber material in the region of the partition is prefixed, precompacted and reinforced;
d) shaping the blank into a three-dimensional reinforcing fiber structure with at least two hollow chambers located adjacent to each other, which are separated from each other by the stitched rib-like partition;
e) arranging in each case at least one expansion device in the hollow chambers of the preform;
f) closing the three-dimensional reinforcing fiber structure formed from the shaped blank, by means of at least one closing seam, as a result of which the outer contour of the three-dimensional reinforcing fiber structure is defined and fixed and the cross-section of the two hollow chambers of the preform is closed and the position of the rib-like partition between these two hollow chambers and in the total cross-sectional profile of the preform is clearly fixed;
g) positioning the preform in an injection mould and closing the injection mould;
h) expanding the expansion devices, as a result of which the latter are applied to the inner circumference of the hollow chambers and at the same time from opposite sides to the stitched rib-like partition, and press the preform against the inner contour of the injection mould;
i) injecting resin into the injection mould between the inner circumference of the mould and the outer circumference of the expansion devices; and hardening the resin.

The method according to the present invention is therefore carried out as a resin injection method (e.g. a RTM (resin transfer molding) method). The two-dimensional, web-like reinforcing fiber material used for manufacture of the preform can be provided e.g. in the form of fiber mats or non-woven fabrics with an agglomerate of single fibers (long or short fibers), interlaid, woven or knitted fabrics or other single- or multi-layer two-dimensional reinforcing fiber fabrics as well as in combinations thereof. Reinforcing fiber material of this kind can be provided in both single and multiple layers. Fibers of glass, carbon, aramid, metal and also natural fibers (e.g. hemp, flax, jute), or a hybrid of these fibers, are preferably used as reinforcing fibers.

The term "hollow chambers located adjacent to each other" includes, within the meaning of the present invention, generally adjacent hollow chambers, i.e. also those offset and located adjacent to each other as well as one above the other or offset one above the other. A "closed" hollow chamber means a hollow chamber which, at least when looking at the total cross-section of the fiber-composite component, has a closed cross-sectional profile; the hollow chamber can further also be completely closed, however, i.e. within the scope of the fiber-composite component form a hollow space which is or can be closed on all sides. The hollow chambers can have identical or different basic shapes and/or dimensions. In step b) the overlap can be made e.g. by folding regions of one or more blanks, or laying them one over the other or against the other. In particular, the order of steps e) and f) can be exchanged; the order to be chosen in each case for these steps depends first and foremost on the exact shape and design of the preform to be manufactured and the associated accessibility of the hollow chambers.

The closing seam appropriately engages a region or flap of the shaped blank adjacent to the partition. The compacting seam which defines the partition and already partly fixes it in position, and the closing seam, therefore together clearly fix the total cross-sectional profile of the preform including the partition. The preform forms a prefabricated subunit which can be delivered as such to the actual resin injection process.

The method according to the present invention makes it possible to manufacture complex HFC components which have at least two closed hollow chambers located adjacent to each other, which are separated from each other by an integral, rib-like partition, with precision of fit and final contours, without a disadvantageous change in the predetermined fiber architecture of the three-dimensional reinforcing fiber structure. In comparison with prior-art technologies, the method according to the present invention here offers a simpler, more effective and more rational manner of production. The method according to the present invention can be employed with the most varied component geometries. The use of molding cores such as are known in the state of the art can basically be dispensed with. Thus coreless HFC components with optimized weight and strength can be achieved.

The method according to the present invention works with an expansion device associated with each hollow chamber, which can be e.g. an inflatable molding tube. In this respect, the method according to the present invention is therefore similar to the conventional tube-blowing RTM method mentioned at the beginning.

Unlike the latter, however, with the solution according to the present invention the following advantages can be achieved: starting from two-dimensional, web-like blanks of reinforcing fiber material, a three-dimensional reinforcing fiber structure of almost any shape can be provided, which has several adjacent hollow chambers which are separated from each other by a rib/partition; the rib-like partition can be reliably integrated in the reinforcing fiber structure; an almost freely selectable fiber architecture can be achieved; and hence prefabricated preforms or component parts of preforms with almost any fiber architecture can be provided. And in spite of the use of e.g. two inflatable molding tubes, with the method according to the present invention reliable positioning and stability of shape of the rib/partition as well as the maintenance of a predetermined fiber architecture during the manufacturing process can be obtained.

The inventor of the present method found that, in particular, by stitching substantially the whole surface of overlapping regions of blanks of reinforcing fiber material by means of a compacting seam, the shape and dimensions of a rib-like partition as well as its position in relation to adjacent blank regions can be fixed, and the reinforcing fiber material in the region of the partition can be prefixed, precompacted and reinforced, which affords considerable advantages.

If a blank prepared in this way or a corresponding "two-dimensional" reinforcing structure is shaped in the manner described above into a three-dimensional reinforcing fiber structure or a preform with at least two hollow chambers located adjacent to each other, and then closed with a closing seam, then not only is the outer contour of the three-dimensional reinforcing fiber structure defined and fixed to match the final contours, but also the cross-section of the two hollow chambers of the preform is closed and the position of the rib-like partition between these two hollow chambers and in the total cross-sectional profile of the preform is clearly fixed. Although during inflation the molding tubes are applied from opposite sides to the stitched rib-like partition, and in this state the partition is not further supported by separate supporting devices or molding cores, it remains stable in shape and retains its position, shape and fiber architecture within the total cross-sectional profile.

This is ensured decisively by precompacting and reinforcement by means of the compacting seam in combination with closing of the profile cross-section obtained by the closing seam. Due to precompacting, upon inflation of the molding tubes the setting distance in the partition is very short too, which additionally favors the arrangement of the partition in a precise position and stability of its shape. Further, in case of pressurization from the interior of the hollow chambers produced by the expansion devices or molding tubes, the whole preform too remains stable in shape to a high degree. The forces arising in the preform are here likewise absorbed by the closing seam and the compacting seam. The partition of the preform retains its position during injection of the resin too, as a result of which the partition is exactly positioned and shaped in the finished HFC component.

The method according to the present invention also permits, within the framework of the steps or stitching technique described above, the manufacture of a complex preform precisely matching the molding or a hollow, three-dimensional reinforcing fiber structure for such a preform matching the final contour. It is also possible to further process several individual three-dimensional reinforcing fiber structures into even more complex preforms. The preform can moreover itself take up the pressures arising during tube blowing already to a high degree. This is substantially aided by the closing seams which bear the pressures generated by the molding tubes in the expansion step. The strength obtained in this way is sufficient because further increasing pressures after overcoming the more or less loose fixing of the preform in the closed injection mould are taken up above the frictional forces which arise between the preform and the injection mould which surrounds the preform.

The present invention also provides an intermediate product for the manufacture of an HFC component that includes a three-dimensional, hollow preform of reinforcing fiber material corresponding to the shape and dimensions of the HFC component (or regions thereof) to be manufactured, with a three-dimensional reinforcing fiber structure which is formed from at least one planar, single- or multi-layer blank of two-dimensional, web-like reinforcing fiber material matching the final dimensions; and with a closable total cross-sectional profile with at least two hollow chambers located adjacent to each other, which are separated from each other by a rib-like partition which is formed by an overlap region of the at least one blank which is stitched in two dimensions by a compacting seam which fixes the shape and dimensions of the rib-like partition as well as its position in relation to adjacent blank regions and prefixes, precompacts and reinforces the reinforcing fiber material in the region of the partition.

With the intermediate product according to the present invention, essentially the same advantages as have already been described above in connection with the method according to the present invention are obtainable.

Furthermore, the present invention provides a HFC component that has at least two hollow chambers located adjacent to each other, which are separated from each other by an integral, rib-like partition, including at least one intermediate product as described above with at least one three-dimensional, hollow preform of reinforcing fiber material corresponding to the shape and dimensions of the HFC component (or regions thereof), wherein the HFC component according to the present invention is an HFC component which is selected from a group of HFC components including: an aircraft door supporting link, an aircraft aerofoil, an aerofoil or rotor blade flap, a tail unit, a rotor plane rotor blade, a wind power plant rotor blade, and components thereof.

With the intermediate product according to the present invention, essentially the same advantages as have already been described above in connection with the method according to the present invention are obtainable.

Preferred embodiments of the present invention with additional design details and further advantages are described in more detail and illustrated below with reference to the attached drawings.

BRIEF DESCRIPTION OF THE DRAWINGS

The present invention is described in detail below with reference to the drawings, which show.

DETAILED DESCRIPTION

In the description below and in the figures, to avoid repetition identical or similar components and elements are also marked with the same reference numbers if no further differentiation is necessary or sensible.

With the method according to the present invention an HFC component which has at least two closed hollow chambers located adjacent to each other, which are separated from each other by an integral, rib-like or web-like partition (hereinafter called a rib for short), is manufactured. Manufacture takes place by means of a three-dimensional, hollow preform 2 of reinforcing fiber material corresponding to the shape and dimensions of the HFC component to be manufactured and to be impregnated with resin (hereinafter called a preform 2 for short). For the explanations below it is assumed that the HFC component is an aircraft door supporting link which has a closed total cross-sectional profile with a plurality of adjacent hollow chambers H of substantially identical structure. To illustrate the principle of the method according to the present invention, it is therefore sufficient to look at only two adjacent hollow chambers H. The following statements apply analogously to the remaining hollow chambers H.

First, from a two-dimensional web-like reinforcing fiber material, which in this example is in the form of woven strips of carbon fibers, several planar blanks 4, 6, 8 of a reinforcing fiber structure of the preform matching the final dimensions are made. Basically, these blanks 4, 6, 8 can be in one or more layers. The number of blanks can vary, depending on the component and the wall thickness to be made. The individual blanks 4, 6, 8 are oriented relative to each other in such a way, and if necessary laid one over the other in such a way, that with a view to the subsequent preform a desired, predetermined fiber architecture is produced.

Figure 1:
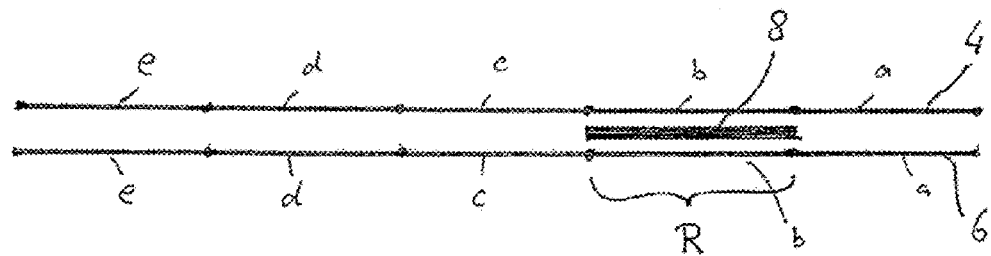
FIG. 1 a schematic side view of a prepared blank of reinforcing fiber material in a first stage of the method according to the present invention.

In FIG. 1 is shown a schematic side view of such a prepared blank of reinforcing fiber material in a first stage of the method according to the present invention. As can be seen in this drawing, two blanks 4, 6 are laid one over the other so as to overlap. In an overlap region R which later defines the rib 10 of the preform 2, in addition a third blank 8 is arranged between the two blanks 4 for reinforcement. In FIG. 1 the blanks 5, 6 located one over the other are divided into sections a to e. The beginning and end of a respective section is marked by a dot. This serves for easier illustration of the shaping of the blanks into a three-dimensional reinforcing structure described in even more detail below, and easier identification of the exact position of the respective sections in the total cross-section of this reinforcing structure or of the preform 2.

Figure 2:
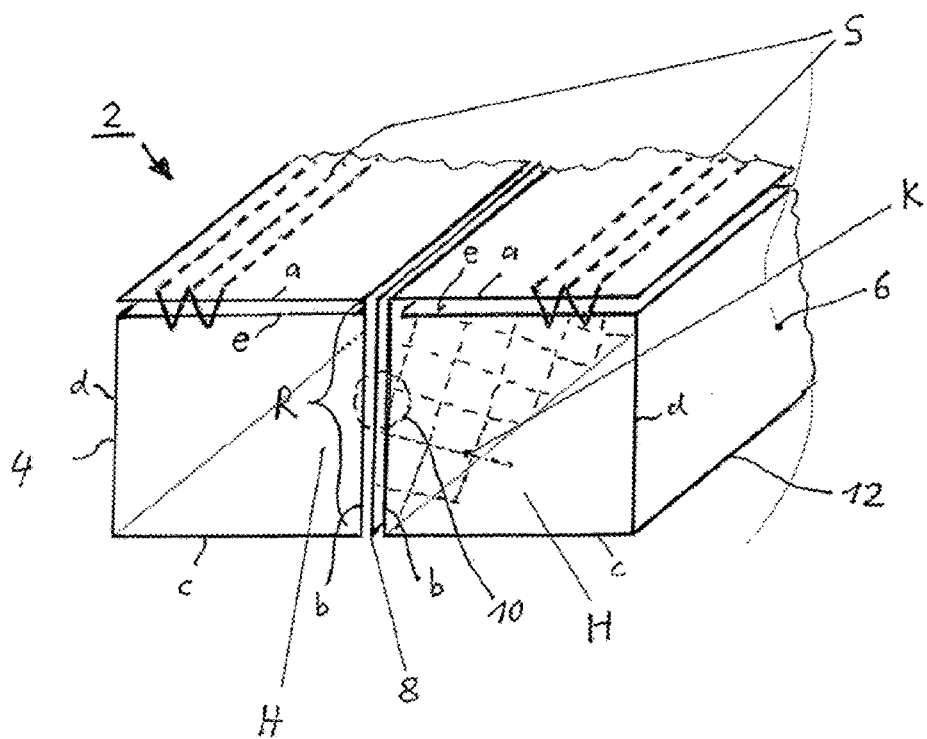
FIG. 2 a schematic perspective front view of a three-dimensional preform made from the blank of FIG. 1 in a second stage of the method according to the present invention.

Then the overlap region R is stitched substantially over the whole surface by means of a compacting seam K (see FIG. 2). The compacting seam K in the present case is applied in a grid substantially over the full height and length of the rib 10; at the same time it defines the contour lines of the rib 10. The grid holes formed by the grid-like stitching are rhombic in this example (cf. FIG. 2). But basically they can have any other suitable contour shape, for example, a square, rectangular or other polygonal shape, a round or star shape, and the like. A section of the two-dimensionally stitched compacting seam K, defining an upper or lower edge of the rib 10 referred to the cross-section of the rib 10 (cf. FIG. 2), forms a draping zone which ensures a predetermined drapability of the fiber architecture of adjacent blank regions. Due to the compacting seam K applied in the overlap region R, the shape and dimensions of the rib 10 as well as its position in relation to adjacent blank regions are clearly fixed. Further, the reinforcing fiber material of the blanks stitched in this way is prefixed, precompacted and reinforced in the region of the rib 10.

The blanks 4, 6, 8 stitched in this way, whose other regions either remain flexible or if necessary can have further point or line seams as well as additional compacting seams K, are now shaped into a three-dimensional preform reinforcing fiber structure 12 which is adapted to the shape and dimensions of the hollow supporting link to be manufactured, and which has two hollow chambers H located adjacent to each other, which are separated from each other by the stitched rib 10. Shaping of the stitched blanks 4, 6, 8 here takes place by draping or folding. This step can, to improve dimensional stability and precision of shape of the preform 2, be performed e.g. in an injection mould or outside it e.g. by means of a three-dimensional stitching manufacture means. The basic structure of the three-dimensional reinforcing fiber structure 12 formed in this way is outlined in FIG. 2 which shows a schematic perspective front view of a three-dimensional preform 2 made from the blank of FIG. 1, in a second stage of the method according to the present invention. From this drawing can also be seen clearly the new position of the respective sections a to e as well as the draping zones or fold lines which define the position and orientation of the respective sections a to e. The flap-like sections a and e for the time being lie loosely one over the other and can also be folded up.

By the steps described above there is formed an intermediate product for manufacture of the hollow supporting link which includes the three-dimensional, hollow preform 2 of reinforcing fiber material corresponding to the shape and dimensions of the supporting link to be manufactured. This preform 2 has the three-dimensional reinforcing fiber structure 12 which is formed from at least one planar, single- or multi-layer blank 4, 6, 8 of two-dimensional, web-like reinforcing fiber material matching the final dimensions. Further, this preform 2 has a closable total cross-sectional profile with two hollow chambers H located adjacent to each other, which are separated from each other by the rib 10. The rib 10 is here formed by an overlap region (R) of the blanks 4, 6, 8 which is stitched in two dimensions by the compacting seam K. The compacting seam K here fixes the shape and dimensions of the rib 10 as well as its position in relation to adjacent blank regions a, c and prefixes, precompacts and reinforces the reinforcing fiber material or the layers of the blanks 4, 6, 8 in the region of the rib 10. This results in the prefixed, precompacted and reinforced rib 10.

In the region of the sections a and e, the three-dimensional reinforcing fiber structure 12 is now closed by means of at least one closing seam S. It is explicitly pointed out that, depending on the type and shape of the HFC component to be manufactured as well as the drape selected in each case, the closing seam S can of course also be located in other suitable locations or sections. Application of the closing seam S takes place appropriately by means of the above-mentioned three-dimensional stitching manufacture means. The closing seam S is constructed as a double saddle-stitch seam, because this has a low breaking elongation and sufficient seam strength and in subsequent steps (see below) can take up the forces produced by an expansion device or an inflatable molding tube in the preform 2. To make a double saddle-stitch seam, the use of an upper thread and a lower thread is necessary. For this reason, the closing seam S can be made particularly advantageously by means of a feed-off-the-arm sewing machine. Another type of seam suitable for the closing seam S is, for example, a chain-stitch seam.

By applying the closing seam S, the outer contour of the three-dimensional reinforcing fiber structure 12 is clearly defined and fixed. And at the same time the cross-section of the two hollow chambers H of the preform 2 is closed, and the position of the rib 10 between these two hollow chambers H and in the now also closed total cross-sectional profile of the preform 2 is clearly fixed (cf. FIG. 2).

As the side of the preform facing towards the viewer in FIG. 2 is open in this embodiment, one expansion device 14 (here, an inflatable molding tube 14; cf. FIG. 3) can be arranged in the respective hollow chamber H of the preform 2 after closing. As already mentioned, however, depending on the selected embodiment of the preform 2 it may be necessary to exchange the order of the steps of closing the three-dimensional reinforcing fiber structure 12 and arranging the expansion device 14 inside the hollow chambers H.

Figure 3:
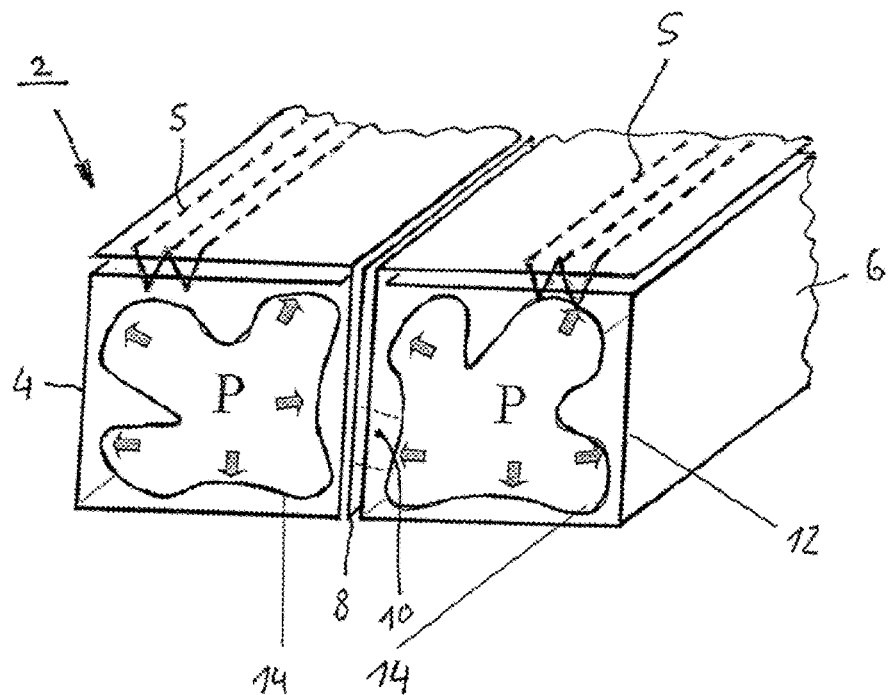
FIG. 3 a schematic perspective front view of the preform of FIG. 2 in a third stage of the method according to the present invention.

The inflatable molding tubes 14 can be seen in FIG. 3 which shows a schematic perspective front view of the preform 2 of FIG. 2 in a third stage of the method according to the present invention. The molding tubes 14 are in the present case made from a thin, light, film-like material. Basically, the material of a molding tube 14 can be made either largely non-stretch or elastic. The two molding tubes 14 located in the hollow chambers H are connected to each other, so that they are to be actuated and inflated together or simultaneously.

Similarly, however, molding tubes 14 to be actuated independently of each other are possible too.

The molding tubes 14 preferably have an or a common adapter which can be connected to a corresponding adapter of an external expansion device actuator, i.e. located outside the preform. The adapter of a molding tube 14 can, in the case of a fully closed hollow chamber H, for example protrude through an opening formed in the reinforcing fiber material of the preform 2. The corresponding adapter can be provided e.g. on the injection mould itself or separately from it. The preform 2 equipped with the molding tubes 14 is available to the further steps of the method as a prefabricated unit.

The prefabricated preform 2 is now laid in an injection mould adapted to the outer shape and dimensions of the supporting link to be manufactured, and exactly positioned and oriented in it. The adapter of the molding tubes 14 is coupled to the corresponding adapter of the injection mould and the injection mould is closed. Then the molding tubes 14 are inflated (cf. FIG. 3). As a result they are applied to the inner circumference of the hollow chambers H and simultaneously from opposite sides to the stitched rib 10, and press the preform 2 due to the internal pressure P generated in the molding tubes 14 against the inner contour of the surrounding injection mould. Then a resin, e.g. epoxy resin, is injected into the injection mould and between the inner circumference of the mould and the outer circumference of the molding tubes 14, and the resin is hardened. As a result, the hollow fiber-composite supporting link is finished and can be removed from the injection mould and delivered to further treatment steps.

Figure 4:
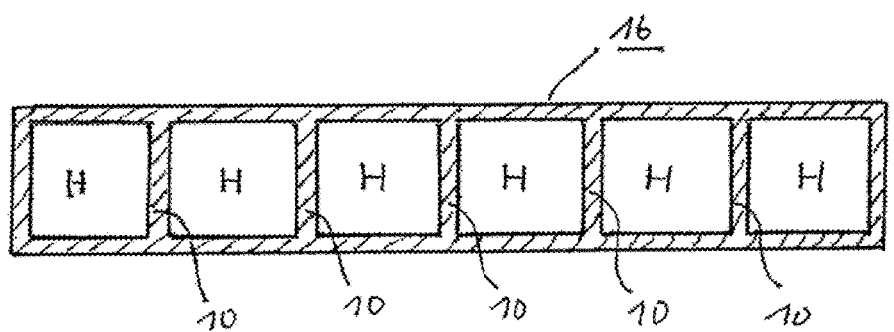
FIG. 4 a schematic cross-sectional view of a first HFC component made by means of the preform of FIGS. 2 and 3.

In FIG. 4 is shown a schematic cross-sectional view of a hollow fiber-composite supporting link 16 made by the method according to the present invention. The supporting link has a closed total cross-sectional profile with a plurality of adjacent hollow chambers H of substantially identical structure which are in each case separated from each other by an integral, continuous rib 10. The preform 2 described above which is shown in FIGS. 2 and 3 by way of example with only two of the hollow chambers H was used for manufacture of the supporting link 16.

At this point, attention should be drawn to the fact that, with the method according to the present invention, after hardening of the resin the molding tubes 14 remain in the manufactured HFC component 16. This is possible primarily when using very lightweight, film-like molding tubes 14 in conjunction with HFC components whose hollow chambers H are closed completely or on all sides. If, on the other hand, the hollow chambers H are open on at least one side, then it is recommended that the molding tubes 14 be removed.

Figure 5:
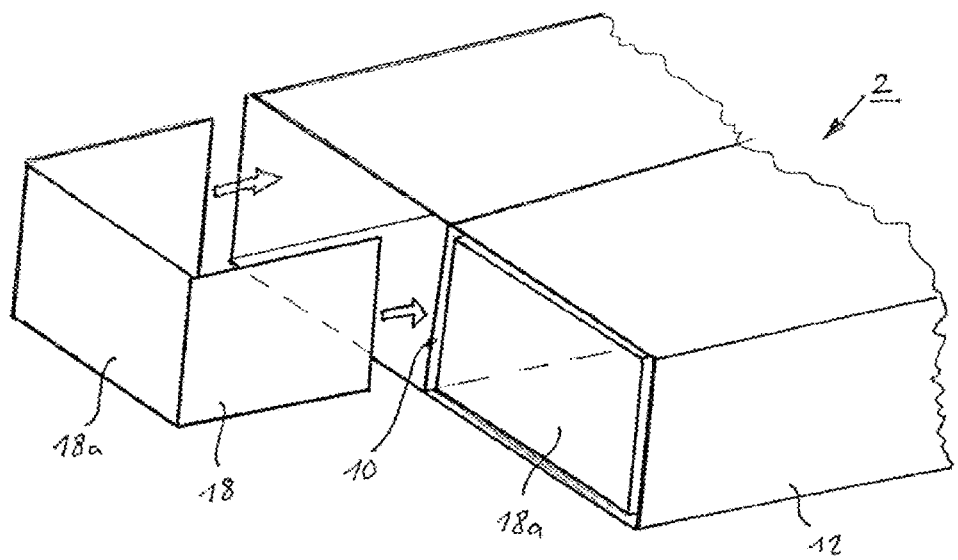
FIG. 5 a schematic perspective view of an auxiliary preform which can be inserted in a preform.

FIG. 5 shows a schematic perspective view of a preform 2 whose respective hollow chambers H are open on at least one side of the preform 2. To close this open side and to form a hollow chamber H closed on all sides, an auxiliary preform 18 of reinforcing fiber material is inserted like a drawer in the open side and closes it with a closing wall 18a. As shown in FIG. 5, the auxiliary preform 18 is frame-shaped in this embodiment. Similarly, for example a cap-like shape of the auxiliary preform 18 can be produced. Preferably, the auxiliary preform 18 in the inserted state is fixed with a seam to the preform 2. The seam is preferably a closing seam S of the kind described above.

Figure 6:
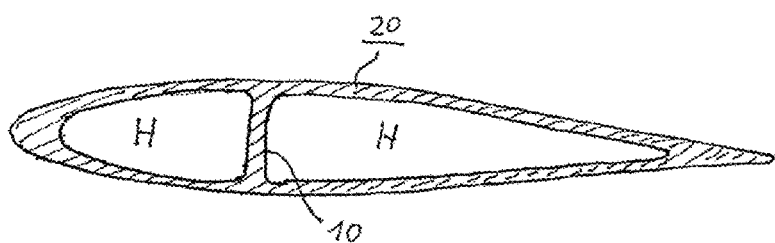
FIG. 6 a schematic cross-sectional view of a second HFC component made by means of the method according to the present invention.

In FIG. 6 is shown in a schematic cross-sectional view a further HFC component made by the method according to the present invention. This is a rotor blade 20 of a helicopter provided with an aerodynamically acting profile. The total cross-sectional profile of the rotor blade 20 has two closed hollow chambers H of different shape and size located adjacent to each other, which are separated from each other by an integral rib 10.

The present invention is not confined to the above embodiments, which serve only as a general illustration of the core concept of the present invention. Within the scope of protection the method of the present invention, the intermediate product of the present invention and the HFC component made from it may instead assume forms and designs other than those described specifically above. The blanks used for manufacture of the three-dimensional reinforcing fiber structure can, depending on the shape and dimensions of the preform or fiber-composite component to be made, be overlapped, stitched and draped other than as described above. The three-dimensional reinforcing fiber structure may also be constructed from one or more partial units.

In addition to the rib-like or web-like partition, if necessary further regions of the blanks can also be provided with a compacting seam. In particular the closing wall of the auxiliary preform is in certain applications to be designed with a compacting seam substantially over the whole surface. If, for instance, a cap-shaped auxiliary preform with a closing wall stitched in this way is further inserted in a hollow chamber of the preform, then this closing wall can form an additional inner rib which extends approximately at a right angle to the ribs 10 shown in the above-mentioned figures in cross-sectional profile. To manufacture a corresponding HFC component, at least two expansion devices which are arranged one behind the other in the longitudinal direction of the hollow chamber concerned and between which the stitched closing wall extends would then be necessary.

Instead of inflatable molding tubes, the use of other expansion devices is also conceivable, e.g. expandable foams, expansion bodies, elastic compressible molding cores or the like. A slightly modified variant of the method according to the present invention in which, instead of the expansion devices, solid mould cores are used to form the hollow chambers, can also be carried out. Compared with the method according to the state of the art described at the beginning, which also operates with solid mould cores, the advantage of improved fiber architecture is then always afforded because, on account of the rib/partition stitched with the compacting seam in cooperation with the closing seam, an unwanted change in the fiber orientation or displacement of fiber layers during the production process can be effectively avoided.

By the method according to the present invention, in addition to the supporting link described or the rotor blade, other HFC components of similar structure with at least two hollow chambers located adjacent to each other as well as corresponding intermediate products for such HFC components can be manufactured. This in particular it is also possible with the method according to the present invention to manufacture an aircraft aerofoil, an aerofoil flap, a tail unit, a wind power plant rotor blade, or the like, and components thereof.

Reference numbers in the claims, the description and the drawings serve only for a better understanding of the present invention and are not intended to limit the scope of protection.

LIST OF REFERENCE NUMBERS 2 preform of reinforcing fiber material
4 first blank
6 second blank
8 third blank
10 rib/rib-like partition
12 three-dimensional reinforcing fiber structure of 2
14 expansion device/inflatable molding tube 16 supporting link/HFC component
18 auxiliary preform of reinforcing fiber material
18a closing wall of 18
20 rotor blade/HFC component
a . . . e sections of 4, 6
H hollow chamber(s)
K compacting seam
P pressure in 14
R overlap region of 4, 6, 8 for forming rib 10
S closing seam

What is claimed is:

1. A three-dimensional hollow fiber component comprising:
    an integrated rib of a two dimensional web-like reinforcing material;
    a first sheet having first, second, third, fourth and fifth consecutive adjacent sheet sections, the first and fifth sections being end sections, the sheet being shaped so as to surround a first chamber such that the first and fifth sections overlap to form a top wall of the first chamber and are stitched to each other by at least one seam, wherein the second section forms a first side wall and the fourth section forms a second side wall opposite the first side wall and the third section forms a bottom wall, the first sheet being comprised of the web-like reinforcing material impregnated with hardened resin; and
    a second sheet having first, second, third, fourth and fifth adjacent consecutive sheet sections, the first and fifth sections being end sections, the sheet sections being shaped so as to surround a second chamber such that the first and fifth sections overlap to form a top wall of the second chamber and are stitched to each other by at least one seam, wherein the second section forms a first side wall and the fourth section forms a third side wall opposite the first side wall and the fourth section forms a bottom wall, the second sheet being comprised of the web-like reinforcing material impregnated with hardened resin,
    wherein the first side wall of the first chamber and the first side wall of the second chamber are stitched together using a plurality of compacting seams so as to form a single divider between the first and the second chambers, the compacting seams being in a form of a grid and covering the full height and length of the divider.

2. The three-dimensional hollow fiber component as recited in claim 1, further comprising at least one expansion device disposed inside a respective one of the first and the second chambers.

3. The three-dimensional hollow fiber component as recited in claim 2, wherein the expansion device includes an expansion adapter connectable to a corresponding adapter of an external expansion device actuator.

4. The three-dimensional hollow fiber component as recited in claim 2, wherein the expansion device includes an inflatable molding tube.

5. The three-dimensional hollow fiber component as recited in claim 1, wherein one of the first and the second chamber is open on at least one chamber end to define a preform and further comprising an auxiliary preform of reinforcing fiber material disposed in the open chamber end in a drawer-like manner so as to close the open chamber end.

6. The three-dimensional hollow fiber component as recited in claim 5, wherein the auxiliary preform is fixed with a seam to the preform.

7. A three-dimensional hollow fiber component comprising:
    an integrated rib of a two dimensional web-like reinforcing material;
    a first sheet having first, second, third, fourth and fifth consecutive adjacent sheet sections, the first and fifth sections being end sections, the sheet shaped so as to surround a first chamber such that the first and fifth sections overlap to form a top wall of the first chamber and are stitched to each other by at least one seam, wherein the second section forms a first side wall and the fourth section forms a second side wall opposite the first side wall and the third section forms a bottom wall, the first sheet being comprised of the web-like reinforcing material impregnated with hardened resin; and
    a second sheet having first, second, third, fourth and fifth adjacent consecutive sheet section, the first and fifth sections being end sections, the sheet sections shaped so as to surround a second chamber such that the first and fifth sections overlap to form a top wall of the second chamber and are stitched to each other by at least one seam, wherein the second section forms a first side wall and the fourth section forms a third side wall opposite the first side wall and the fourth section forms a bottom wall, the second sheet being comprised of the web-like reinforcing material impregnated with hardened resin,
    wherein the first side wall of the first chamber and the first side wall of the second chamber are stitched together using a plurality of compacting seams so as to form a single divider between the first and the second chambers, the compacting seams being in a form of a grid and covering the full height and length of the divider,
    wherein the three-dimensional hollow fiber-composite component is included in one of an aircraft door supporting link, an aircraft aerofoil, an aerofoil flap, a rotor blade flap, a tail unit, a rotor plane rotor blade, and a wind power plant rotor blade.

* * * * *